U. HOUZE.
DEVICE FOR FORMING GLASS CYLINDERS FOR WINDOW GLASS.
APPLICATION FILED DEC. 24, 1912.
1,128,269.
Patented Feb. 9, 1915.
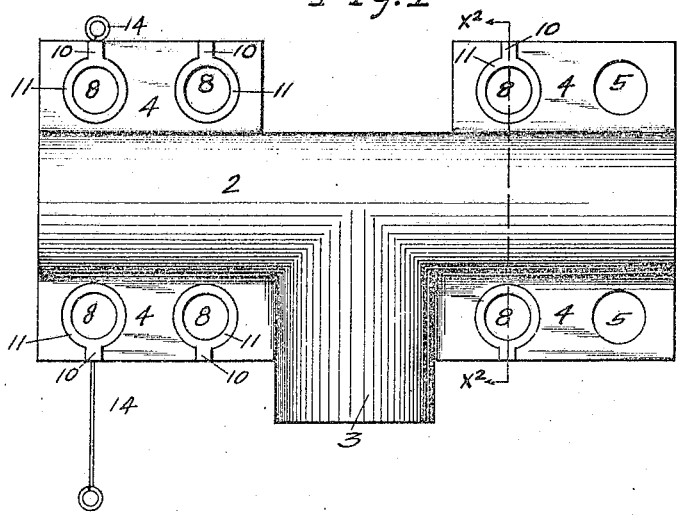
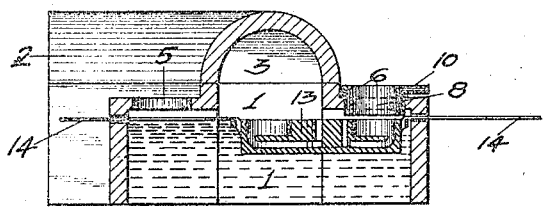
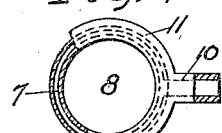
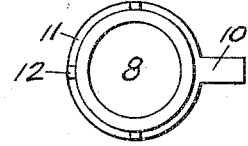
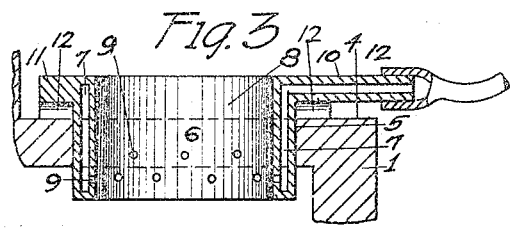
Witnesses:-
Gertrude Geffen.
J. W. Chester.
Inventor,
ULGISSE HOUZE.
By
His Attorney

UNITED STATES PATENT OFFICE.

ULGISSE HOUZE, OF POMONA, CALIFORNIA.

DEVICE FOR FORMING GLASS CYLINDERS FOR WINDOW-GLASS.

1,128,269.

Specification of Letters Patent.

Patented Feb. 9, 1915.

Application filed December 24, 1912. Serial No. 739,569.

*To all whom it may concern:*

Be it known that I, ULGISSE HOUZE, a citizen of the United States, residing at Pomona, in the county of Los Angeles and State of California, have invented a new and useful Device for Forming Glass Cylinders for Window-Glass, of which the following is a specification.

My invention relates to devices for forming glass cylinders for the manufacture of window glass and an object is to provide a means of cooling the glass cylinders as they are withdrawn from the furnace or glass tank; another object is to provide a means which will serve to eliminate the necessity of frequently removing the thimbles from the top of the tank for exterior cooling purposes.

Other objects may appear in the subjoined detailed description of which—

Figure 1 is a plan of a glass tank showing my thimbles or cooling devices in position; Fig. 2 is a sectional elevation on the line $x^2$—$x^2$, Fig. 1 showing a floating receptacle in position in the tank and the relative position of the latter with respect to the thimbles during a glass drawing operation; Fig. 3 is an enlarged sectional elevation of the thimbles in the same position as shown in Fig. 2 but shown more clearly; Fig. 4 is a plan of the thimble with a portion of the flange broken away; Fig. 5 is a bottom view of the thimbles showing the supporting lugs.

Similar reference numerals indicate the same parts throughout the specifications and the several views of the drawings.

I am aware of patents having been granted upon numerous devices for forming glass cylinders and for cooling the same as they are formed, but the cooling process has involved the use of water for such purposes, whereas my device eliminates any extra connections, such as for water etc., and involves the use of air for accomplishing the desired result.

In the drawings, I show enough of the other elements which enter into the art of glass making to properly illustrate the value and use of my device, and in which 1 is a common type of glass tank furnace having the hooded tops 2 and 3 at right angles to each other, the projection 3 serving as a means of connection to a larger central tank common to a plurality of tanks of the character shown. On each side of the longitudinal hooded section 2 are the flat top surfaces 4 provided with the circular openings 5, said openings generally being arranged in pairs across the tank at right angles to the longitudinal center line thereof for convenience in transferring a float from one side to the other of the tank in successive glass forming operations. The thimbles 6 are double walled and are provided with the annular air chamber 7 between the walls, the central openings 8, the perforations 9 in the inner wall communicating with the air chamber 7, the outwardly extending hollow lip 10 the opening or passage of which is connected with the air chamber 7 and serves as an air inlet, the flange 11 and the lugs 12 on the bottom of the flange and adapted to rest upon the top surface 4 of the tank when the thimbles are in proper position for drawing a cylinder. A suitable air supply tube connected with an air tank or compressor may be pressed on the lip 10 as shown in Fig. 3 or the air supply may be otherwise suitably connected thereto.

The thimbles 6 are adapted to seat removably in the openings 5 on the top 4 of the tank and they may be used in any style of tank or in connection with any form of float, but for convenience I show them in connection with the form of float invented by me and claimed in an application filed Feb. 9, 1914, Serial No. 819,096. The floating receptacle 13 is adapted to float on the molten glass with its top a little above the level of the glass and the body proper submerged in the glass. It is provided with two chambers, one on each end which are provided with outlets on the side of the floats communicating with the molten glass in the tank. These floats are adapted to be drawn from one side of the tank to the other by means of the iron rods 14 slidably positioned in the sides of the tank, the chamber on one end of the float being adapted to register with a thimble on one side of the tank when it is drawn over to that side of the tank and the chamber on the other end of the float is adapted to register with the opposite thimble on the other side of the tank when the float is drawn to that side.

In operation, the float being drawn over to the side of the tank so that the chamber therein will register with its respective thimble, a glass blowing tube is inserted in the thimble and the chamber in the float so that the pressure in the tube will force the glass up through the chamber and the thimble in the form of a cylinder. The float and the thimble are refractory and the air forced into the thimble between the walls and through the perforations 9 on to the cylinder being formed will cause a rapid cooling of the glass as it is drawn, and the air supply being constant renders it unnecessary to frequently remove the thimbles for exterior cooling, but in the event that it should become necessary or desirable to remove the thimbles, this may be easily done by grasping the lip 10 and lifting the thimble out of its seat.

Having thus described my invention what I claim as new and desire Letters Patent for is:

1. In a device for forming glass cylinders, the combination with a glass tank having a floating receptacle therein, of a thimble adapted to be removably inserted in the top of and to extend downwardly into said tank to a point near the top of said floating receptacle and to register therewith, and said thimble having a central opening through which a cylinder of glass is adapted to be formed, an inner and an outer wall and an annular air passage formed therebetween, an outwardly projecting lip at the top of said thimble having a passage communicating with said annular passage for admitting a current of air from an air supply means thereto, and a plurality of perforations in said inner wall affording communication between said annular passage and said central opening for directing said current of air against said cylinder as it is formed, for cooling it, as described.

2. In a device for forming glass cylinders, the combination with a glass tank having a floating receptacle therein, of a thimble adapted to be removably inserted in the top of and to extend downwardly into said tank to a point near the top of said floating receptacle and to register therewith, and said thimble having a central opening through which a cylinder of glass is adapted to be formed, an inner and an outer wall and an annular air passage formed therebetween, an outwardly projecting lip at the top of said thimble having a passage communicating with said annular passage for admitting a current of air from an air supply means thereto, a plurality of perforations in said inner wall affording communication between said annular passage and said central opening for directing said current of air against said cylinder as it is formed, for cooling it, and a flanged top to said thimble, as described.

3. In a device for forming glass cylinders, the combination with a glass tank having a floating receptacle therein, of a thimble adapted to be removably inserted in the top of and to extend downwardly into said tank to a point near the top of said floating receptacle and to register therewith, and said thimble having a central opening through which a cylinder of glass is adapted to be formed, an inner and an outer wall and an annular air passage formed therebetween, an outwardly projecting lip at the top of said thimble having a passage communicating with said annular passage for admitting a current of air from an air supply means thereto, a plurality of perforations in said inner wall affording communication between said annular passage and said central opening for directing said current of air against said cylinder as it is formed, for cooling it, a flanged top to said thimble, and a plurality of lugs on the lower side of said flanged top adapted to rest upon the top of said tank for holding said thimble in position, as described.

ULGISSE HOUZE.

Witnesses:
J. E. BOOKSTAVER,
LUTHER L. MACK.